(12) United States Patent
Babu et al.

(10) Patent No.: US 12,122,963 B2
(45) Date of Patent: *Oct. 22, 2024

(54) NAPHTHA CATALYTIC CRACKING PROCESS

(71) Applicant: SABIC Global Technologies B.V., Bergen op Zoom (NL)

(72) Inventors: Mamilla Sekhar Babu, Geleen (NL); Talal Khaled Al-Shammari, Riyadh (SA)

(73) Assignee: SABIC Global Technologies B.V., Bergen Op Zoom (NL)

( * ) Notice: Subject to any disclaimer, the term of this patent is extended or adjusted under 35 U.S.C. 154(b) by 389 days.

This patent is subject to a terminal disclaimer.

(21) Appl. No.: 17/630,441

(22) PCT Filed: Jul. 14, 2020

(86) PCT No.: PCT/IB2020/056611
§ 371 (c)(1),
(2) Date: Jan. 26, 2022

(87) PCT Pub. No.: WO2021/019344
PCT Pub. Date: Feb. 4, 2021

(65) Prior Publication Data
US 2022/0282169 A1    Sep. 8, 2022

Related U.S. Application Data

(60) Provisional application No. 62/881,229, filed on Jul. 31, 2019.

(51) Int. Cl.
*C10G 51/06* (2006.01)
*B01D 3/14* (2006.01)
(Continued)

(52) U.S. Cl.
CPC ............ *C10G 51/06* (2013.01); *B01D 3/143* (2013.01); *C10G 69/06* (2013.01);
(Continued)

(58) Field of Classification Search
CPC ........ C10G 51/00; C10G 51/06; C10G 69/04; C10G 69/06; C10G 9/00; C10G 9/36;
(Continued)

(56) References Cited

U.S. PATENT DOCUMENTS

2016/0362618 A1    12/2016    Oprins et al.
2016/0369189 A1    12/2016    Ward et al.
(Continued)

FOREIGN PATENT DOCUMENTS

CN    102803184 A    11/2012
CN    103374395 A    10/2013
(Continued)

OTHER PUBLICATIONS

International Search Report and Written Opinion from PCT/IB2020/056611 dated Oct. 8, 2020, 9 pages.

*Primary Examiner* — In Suk C Bullock
*Assistant Examiner* — Jason Y Chong
(74) *Attorney, Agent, or Firm* — Norton Rose Fulbright US LLP (57) ABSTRACT

Systems and methods for processing full range naphtha feeds to produce a light olefins stream and an aromatics stream concerns integration of catalytic cracking with steam cracking to maximize production of aromatics and olefins.

20 Claims, 2 Drawing Sheets (51) Int. Cl.
*C10G 69/04* (2006.01)
*C10G 69/06* (2006.01)

(52) U.S. Cl.
CPC .......... *C10G 2300/1044* (2013.01); *C10G 2300/4081* (2013.01); *C10G 2400/20* (2013.01); *C10G 2400/30* (2013.01)

(58) Field of Classification Search
CPC ...... C10G 2300/104; C10G 2300/1044; C10G 2300/4081; C10G 2400/20; C10G 2400/30; C10G 45/00; C10G 11/00; C10G 11/04; C10G 11/182; C10G 35/00; C10G 35/02; C10G 35/04; C10G 35/06; C10G 55/08; B01D 3/143; C07C 4/02; C07C 4/04; C07C 4/06
See application file for complete search history.

(56) References Cited

U.S. PATENT DOCUMENTS

| 2018/0057758 A1* | 3/2018 | Al-Ghamdi | C10G 9/36 |
| 2021/0222073 A1* | 7/2021 | Al-Shammari | C10G 51/06 |

FOREIGN PATENT DOCUMENTS

| CN | 105339470 A | 2/2016 |
| CN | 105452423 A | 3/2016 |
| CN | 106221786 A | 12/2016 |
| CN | 105349179 B | 4/2017 |
| CN | 109661451 A | 4/2019 |
| WO | WO2015000846 A1 | 1/2015 |
| WO | WO2015128038 A1 | 9/2015 |
| WO | WO2016098909 A1 | 6/2016 |
| WO | WO2016192041 A1 | 12/2016 |

* cited by examiner

NAPHTHA CATALYTIC CRACKING PROCESS

CROSS REFERENCE TO RELATED APPLICATIONS

This application is a national phase application under 35 U.S.C. § 371 of International Application No. PCT/IB2020/056611 filed Jul. 14, 2020, which claims priority to U.S. Provisional Patent Application No. 62/881,229 filed Jul. 31, 2019. The entire contents of each of the above-referenced disclosures is specifically incorporated by reference herein without disclaimer.

BACKGROUND OF THE INVENTION

A. Field of the Invention

The invention generally concerns processing full range naphtha feeds to produce a light olefins stream and an aromatics stream. In particular, the invention concerns integration of catalytic cracking with steam cracking to maximize production of aromatics and olefins.

B. Description of Related Art

Ethylene, propylene, butenes, butadiene, and aromatic compounds such as benzene, toluene, and xylene (BTX) are basic intermediates for a large portion of the petrochemical industry. They are mainly obtained through the thermal cracking (sometimes referred to as "steam pyrolysis" or "steam cracking") of petroleum gases and distillates such as naphtha, kerosene, or even gas oil. However, as demands rise for these basic intermediate compounds, other production sources must be considered beyond traditional thermal cracking processes utilizing petroleum gases and distillates as feedstocks.

These intermediate compounds may also be produced through refinery fluidized catalytic cracking (FCC or FC) processes, where heavy feedstocks such as gas oils or residues are converted. For example, an important source for propylene production is refinery propylene from FCC units (FCCU or FCU). However, the distillate feedstocks such as gas oils or residues are usually limited and result from several costly and energy intensive processing steps within a refinery.

Various attempts to produce these intermediate compounds have been described. By way of example, U.S. Patent Application Publication No. 2018/0057758 to Al-Ghamdi et al. describes processing a feedstock hydrocarbon into a lesser boiling point hydrocarbon fraction and a greater boiling point hydrocarbon fraction. The greater boiling point hydrocarbon fraction is hydrotreated, and then catalytically cracked to produce product stream of olefins and BTX. The lesser boiling point hydrocarbons is steam cracked to produce olefins. In another example, Chinese Patent Application Publication No. CN 106221786 describes catalytically cracking naphtha in combination with other cracking units to produce petroleum products. In yet another example, International Application Publication No. WO 2016/19204 describes converting naphtha to lower olefins, light aromatic hydrocarbons and high octane gasoline by catalytically cracking naphtha in combination with steam cracking of lower alkane and catalytic cracking of higher alkane and higher olefin streams.

While various attempts to enhance production of petroleum products from naphtha have been described, they involve complicated processing and, thus, can be inefficient.

SUMMARY OF THE INVENTION

A discovery has been made that provides a solution to at least some of the problems associated with conversion of naphtha into high value petroleum products. The discovery is premised on an integrated catalytic cracking and steam cracking process that can use full range naphtha as the feedstock. The full range naphtha can be separated into a first stream that includes C5− hydrocarbons (e.g., primarily C2 to C4 hydrocarbons), and a second stream that includes C5+ hydrocarbons (e.g., primarily C5 to C12 hydrocarbons). The first stream can be steam cracked to produce a stream that includes C2 to C4 olefins. The second stream can be catalytically cracked to produce an intermediate stream that includes benzene, toluene, and/or xylene (BTX). The C2 to C4 olefins stream can be combined with the BTX stream to produce a third stream that includes C2 to C4 olefins and BTX. The third stream can be separated to produce a BTX product stream, an ethylene product stream, a propylene product stream, and/or a C4 olefins product stream. Portions of the unreacted hydrocarbons from the separation can be recycled to the steam cracking step, the catalytic cracking step, and/or the full range naphtha separation step to continue the cycle. A portion of the third stream and/or the BTX produced stream can be separated into a C5+ olefins stream that are not primarily BTX (non-BTX stream). This stream(s) can be subjected to hydrogenation conditions sufficient to produce a C5+ paraffins stream that can be combined with the naphtha separation step for further processing. Such an integrated process can provide high value petroleum products in a more efficient manner as only one catalytic cracker and one steam cracker are necessary. However, the processes of the present invention can use additional catalytic crackers and steam crackers (e.g., in parallel or series). The process also generates heat and/or fuel for the catalytic cracking process.

In one aspect of the present invention, methods to produce olefins and/or BTX are described. A method can include: (a) separating a feed stream that includes full range naphtha having an initial boiling point of 20° C. and a final boiling point of 250° C. to produce a first stream that includes C5− hydrocarbons and a second stream that includes C5+ hydrocarbons; (b) subjecting the first stream to steam cracking conditions sufficient to produce a stream that includes C2 to C4 olefins; (c) subjecting the second stream to catalytic cracking conditions sufficient to produce a stream that includes one or more of benzene, toluene, and xylene (BTX); (d) combining the stream that includes C2 to C4 olefins and the stream that includes BTX to produce a third stream; and (e) separating the third stream to form a benzene stream, a toluene stream, a xylene stream, an ethylene product stream, a propylene product stream, and/or a C4 olefins product stream. In certain aspects, the second stream in step (c) can be directly fed to the catalytic cracker without further processing. The second stream can be heated to a temperature of 650 to 700° C. prior to the catalytic cracking of step (c). In some embodiments, the steam cracking and catalytic cracking steps are performed simultaneously or substantially simultaneously. The first stream can be a gaseous stream comprising C4− hydrocarbons (e.g., a propane stream) and/or the second stream can have an initial boiling point of 90° C. and a final boiling point of 210° C. In some embodiments, the third stream that includes C2 to C4 olefins and BTX hydrocarbons can be separated to produce a BTX product stream that includes benzene, toluene, and xylene, or any combination thereof, and a C2 to C4 olefins stream. The BTX product stream can be separated into streams of benzene, toluene, xylene, and C5+ hydrocarbons. The C5+ hydrocarbons can include alkenes and/or higher molecular weight aromatic hydrocarbons. The C5+ hydrocarbons stream can be subjected to hydrogenation conditions suitable to produce a C5+ unsaturated hydrocarbon stream, which can be provided to the naphtha separation step to continue the cycle. Further, any unreacted C5− hydrocarbons from production of the ethylene, propylene and/or C4 olefins product streams can be recycled to the stream cracking step.

In some embodiment, the method can include cooling the third stream from step (d), and providing the cooled third stream to step (e). Cooling can include heat transfer and/or quenching of the third stream; producing a cooled third stream and a light hydrocarbons stream. The cooled third stream can be provided to step (d), and the light hydrocarbon stream can be combusted to generate heat for the catalytic cracking of step (c). This can make the method more energy efficient. The cooled third stream can be separated to produce a C2 to C4 olefins stream that also includes C5− hydrocarbons and an intermediate BTX stream that also includes C5+ hydrocarbons. The intermediate BTX stream can be separated to obtain the BTX product stream that includes at least one of benzene, toluene, and xylene, and a stream that includes C5+ hydrocarbons. The intermediate BTX stream can be separated into streams of benzene, toluene, xylene, and C5+ hydrocarbons. In some embodiments, the intermediate BTX stream is separated into the BTX product stream. The BTX product stream can be separated into streams of benzene, toluene, xylene, and C6+ hydrocarbons. The C5+ hydrocarbons can includes alkenes and/or higher molecular weight aromatic hydrocarbons. The C5+ hydrocarbons stream can be subjected to hydrogenation conditions suitable to produce a C5+ and/or C6+ unsaturated hydrocarbons streams, which can be provided to the naphtha separation step (a) to continue the cycle.

In some embodiments, the C2 to C4 olefins stream can be separated to produce streams of ethylene, propylene, C4 olefins, and a C2 to C4 paraffins stream. The C2 to C4 paraffins stream can be provided to the steam cracking of step (b) to continue the process. Separation can include at least one of the following: de-methanizing compressed light intermediate stream to produce methane and a C2+ hydrocarbons stream; de-ethanizing the C2+ hydrocarbons stream to produce a C2 hydrocarbons stream and a C3+ hydrocarbons stream and separating the C2 hydrocarbons stream to produce an ethylene stream and a ethane stream; de-propanizing the C3+ hydrocarbons stream to produce a C4+ hydrocarbons stream and separating the C3 hydrocarbons stream to produce a propylene stream and a propane stream; de-butanizing the C4+ hydrocarbons stream to produce a C4 hydrocarbons stream and a C5+ hydrocarbons stream, and providing the C5+ hydrocarbons stream to the BTX containing stream. The C4 hydrocarbons stream can be separated to produce a C4 olefins stream and a butane stream that includes unsaturated hydrocarbons stream. The butane stream that includes unsaturated hydrocarbons can be subjected to hydrogenation conditions to produce an alkanes stream. At least one of the ethane, propane, and alkane streams can be provided to the steam cracking of step (b). At least two of the ethane, propane and alkane streams can be combined to form the at least a portion of the unreacted C2 to C4 hydrocarbon stream that can then be provided to the step (b) steam cracking.

In the method of the present invention, the catalytic cracking conditions can include a temperature of 600 to 700° C., a pressure of 1.1 to 3 bar, and residence time of 1 to 10 seconds. A catalytic cracking catalyst can include alumina, silica, zeolite, or combinations thereof. Steam cracking conditions can include a temperature of 800 to 900° C., a steam to hydrocarbon ratio of 0.2 to 0.7, and a residence time of 100 to 5000 ms.

Other embodiments of the invention are discussed throughout this application. Any embodiment discussed with respect to one aspect of the invention applies to other aspects of the invention as well and vice versa. Each embodiment described herein is understood to be embodiments of the invention that are applicable to other aspects of the invention. It is contemplated that any embodiment or aspect discussed herein can be combined with other embodiments or aspects discussed herein and/or implemented with respect to any method or composition of the invention, and vice versa. Furthermore, compositions of the invention can be used to achieve methods of the invention.

The following includes definitions of various terms and phrases used throughout this specification.

The term "cracking" as the term is used herein and in the claims means technology for breaking higher molecular weight hydrocarbons into lower molecular weight hydrocarbons and includes both fluid catalytic cracking and steam cracking.

The phrase "full range naphtha" refers to a hydrocarbon mixture that has an initial boiling point range of 20° C. to 35° C. and a final boiling point range of 200° C. to 250° C.

Cn hydrocarbons refer to hydrocarbons having a carbon number n. Cn+ hydrocarbons refer to hydrocarbons having a carbon number n or higher. Cn− hydrocarbons refer to hydrocarbons having a carbon number n or less. Cn hydrocarbons stream refers to hydrocarbons stream comprising Cn hydrocarbons. By way of example, C4+ hydrocarbons refer to hydrocarbons having a carbon number 4 or higher (e.g. butane, pentane, heptane, etc.). C5− hydrocarbon refers to hydrocarbons having a carbon number 5 or less (e.g. butane, pentane, etc.). C6 to C8 hydrocarbons refer to hydrocarbons having a carbon number 6 to 8 (e.g. hexane, heptane, octane, etc.). C9+ hydrocarbons refer to hydrocarbons having a carbon number 9 or higher (e.g. nonane, decane, etc.). C6 to C8 aromatic hydrocarbons refer to aromatic hydrocarbons having a carbon number 6 to 8 (e.g. benzene, toluene, xylene, etc.). C1 to C4 hydrocarbons refer to hydrocarbons having a carbon number 1 to 4 (e.g. methane, ethane, propane, butane, ethylene, propylene, butylene, etc.). C6 to C8 linear hydrocarbons refer to linear hydrocarbons having a carbon number 6 to 8 (e.g. n-hexane, n-heptane, n-octane, etc.). C5 to C10 olefins refer to olefinic hydrocarbons having a carbon number 5 to 10 (e.g. pentene, hexene, heptene, octene, nonene, decene etc.). C5 to C10 paraffins refer to paraffinic hydrocarbons having a carbon number 5 to 10 (pentane, hexane, heptane, octane, nonane, decane etc.).

The terms "about" or "approximately" are defined as being close to as understood by one of ordinary skill in the art. In one non-limiting embodiment, the terms are defined to be within 10%, preferably within 5%, more preferably within 1%, and most preferably within 0.5%.

The terms "wt. %", "vol. %", or "mol. %" refers to a weight percentage of a component, a volume percentage of a component, or molar percentage of a component, respectively, based on the total weight, the total volume of material, or total moles, that includes the component. In a non-limiting example, 10 grams of component in 100 grams of the material is 10 wt. % of component.

The term "substantially" and/or "primarily" and its variations are defined to include ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The use of the words "a" or "an" when used in conjunction with any of the terms "comprising," "including," "containing," or "having" in the claims, or the specification, may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The methods of the present invention can "comprise," "consist essentially of," or "consist of" particular ingredients, components, compositions, etc. disclosed throughout the specification. With respect to the transitional phrase "consisting essentially of," in one non-limiting aspect, a basic and novel characteristic of the methods of the present invention is their abilities to efficiently produce BTX and olefins from a heavy/full range naphtha feed by integrating catalytic cracking with steam cracking.

The term "primarily," as that term is used in the specification and/or claims, means greater than any of 50 wt. %, 50 mol. %, and 50 vol. %. For example, "primarily" may include 50.1 wt. % to 100 wt. % and all values and ranges there between, 50.1 mol. % to 100 mol. % and all values and ranges there between, or 50.1 vol. % to 100 vol. % and all values and ranges there between.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment or aspect may be combined with features from any of the other embodiments or aspects. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings.

While the invention is susceptible to various modifications and alternative forms, specific embodiments thereof are shown by way of example in the drawings. The drawings may not be to scale.

DETAILED DESCRIPTION OF THE INVENTION

A discovery has been made that provides a solution to at least some of the problems associated with producing ethylene, propylene, butenes, butadienes, benzene, toluene, and xylene. The discovery is premised in an integrated system that is capable of using full range naphtha to produce olefins and aromatics (e.g., BTX). The integrated system includes a catalytic hydrocarbon cracking unit and hydrocarbon steam cracking unit in addition to one or more separation units and/or hydrogenation units.

These and other non-limiting aspects of the present invention are discussed in further detail in the following sections with reference to the figures. The units in the system can include one or more heating and/or cooling devices (e.g., insulation, electrical heaters, jacketed heat exchangers in the wall) or controllers (e.g., computers, flow valves, automated valves, etc.) that can control the reaction temperature and pressure of the units.

Figure 1:
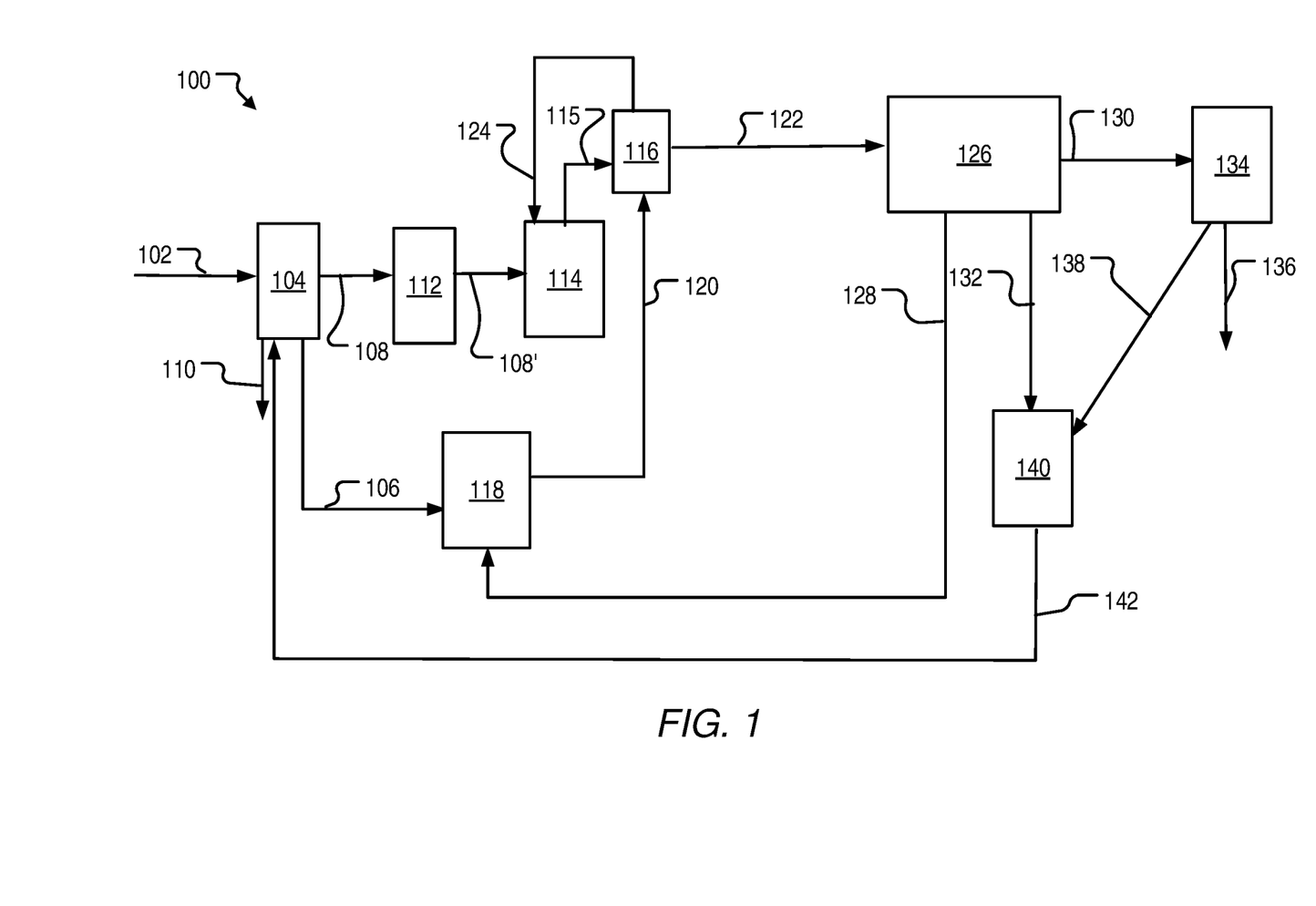
FIG. 1 shows an illustration of a system of the present invention to produce olefins and aromatics.

FIG. 1 shows an illustration of system 100 to produce olefins and BTX from full range naphtha. In system 100, full range naphtha 102 can enter feed conditioning unit 104. In unit 104, the full range naphtha can be heated to a temperature of 200 to 300° C. to produce a first stream 106, a second stream 108, and a heavies stream 110. First stream 106 can have C4− hydrocarbons (e.g., methane, ethane, ethylene, propane, propylene, and optionally butane and butenes). First stream 106 can be a liquid petroleum gas stream (e.g., LPG). Second stream 108 can have an initial boiling point of about 90° C. and 210° C. and include C6+ (e.g., C6 to C12 hydrocarbons). Heavies stream 110 can have C12+ hydrocarbons. Second stream 108 can enter preheating unit 112 and be heated to a temperature of 300 to 500° C. In some embodiments units 104 and 112 are the same unit. Heated second stream 108' can exit preheating unit 112 and enter catalytic cracking unit 114. Catalytic cracking unit 114 can be any known catalytic cracking unit. By way of example, a fluid catalytic cracking (FCCU) also known as a fluid catalytic unit (FCU) are commonly used processes in all modern oil refineries. Cracking can take place using a zeolite-based catalyst in a short-contact time vertical or upward-sloped pipe called the "riser." Pre-heated second stream 108' can be contacted with a fluidized catalyst under conditions suitable to crack the full range naphtha feedstock. Cracking conditions can include temperature, pressure, weight hourly space velocity, residence time or a combination thereof. The catalytic cracking temperature can range from 600 to 700° C. A reaction pressure can be 1.5 to 3 bar. The residence time can be 1 to 10 seconds. Suitable catalytic cracking catalysts can include zeolite-based catalysts such as ZSM-5. The heated catalyst can vaporize the second stream (feed) and catalyzes the cracking reactions that break down the C5+ hydrocarbons (e.g., regular naphtha) into lighter hydrocarbon (lower molecular weight) components. The catalyst-hydrocarbon mixture can flow upward through the riser, and then the mixture can be separated via cyclones to produce effluent stream 115 which is substantially free of catalyst, and spent catalyst. The catalyst-free hydrocarbons can be routed to heat recovery unit 116. Spent catalyst can be disengaged from the cracked hydrocarbon vapors and be sent to a catalyst regeneration unit (not shown) where it can be regenerated and returned to catalytic cracking unit 114. Non-limiting examples of suitable fluid catalytic cracking units include, those based on technology available for license from UOP and KBR Orthoflow.

While second stream 108 or heated stream 108' steam are being catalytically cracked, first gaseous stream 106 can exit separation unit 104 and enter steam cracking unit 118. In steam cracking unit 118, the C2 and C4 saturated hydrocarbons in the gaseous first stream 106 can subjected to conditions to produce smaller molecular weight hydrocarbons (e.g., methane, ethylene, propylene, butenes, etc.). By way of example, first stream 106 can be contacted with steam in a furnace without the presence of oxygen under conditions suitable to crack the C2 to C4 hydrocarbons. Steam cracking conditions can include temperature, pressure, weight hourly space velocity, residence time or a combination thereof. The steam cracking temperature can range from 800 to 900° C. A reaction pressure can be 1.5 to 2 bar. The residence time can be 1 to 1000 ms. After the steam cracking, olefins stream 120 can exit steam cracking unit 118 and enter heat recovery unit 116. In heat recovery unit 116, the hydrocarbons in olefins stream 120 can be combined with effluent stream 115 to produce third stream 122, and produce light hydrocarbons stream 124. Heat recovery unit 116 can include one or more heat exchangers and/or quenching units. Third stream 122 can be a mixture of olefins (e.g., ethylene, propylene, butene, butadiene, pentene, pentane) and C5+ hydrocarbons (e.g., pentane, pentene, hexane, heptane, octane, benzene, xylene, toluene and the like). Light hydrocarbons stream 124 (e.g., methane) can be used a fuel for catalytic cracking unit 114. In some embodiments, light hydrocarbons stream 124 is not produced.

Third stream 122 can exit heat recovery unit 116 and enter separation unit 126. In separation unit 126, third stream 122 can be separated into light intermediate stream 128 that includes C5– hydrocarbons (e.g., unreacted C1 to C5 hydrocarbons), a BTX containing stream 130 that includes BTX, and heavy intermediate stream 132 that can include C5+ olefins, C5+ alkanes, and C8+ aromatics. Separation unit 122 can include one or more units known in the art to separate hydrocarbons into desired streams. A non-limiting illustration is described in FIG. 2. Separation unit can also produce streams (not shown) of ethylene, propylene, butylene, butadiene, benzene, toluene, xylene, or combinations thereof.

Light intermediate stream 128 can include C2 to C4 saturated hydrocarbons (e.g., unreacted C2 to C4 hydrocarbons), and exit separation unit 126 and enter steam cracking unit 118 to continue the cycle. In some instances, light intermediate stream 128 can be combined with first stream 106. In some embodiments, light intermediate stream is the sole feed source for steam cracking unit 118.

BTX containing stream 130 can exit separation unit 126 and enter aromatics extraction unit 134. In extraction unit 134, streams of benzene, toluene, xylene (shown as stream 136), and non-BTX stream 138 stream can be produced. The extraction unit can be any unit or system that extracts BTX species from non-BTX species known in the art. By way of example, a liquid-liquid extraction system or extractive distillation unit or both can be used. The extraction unit can produce a benzene stream, a toluene stream, a xylene stream or any combination thereof (e.g., a benzene/toluene stream, a benzene/xylene stream, toluene/xylene stream, and the like).

Heavies intermediate stream 132 can exit separation unit 126 and/or non-BTX stream 138 can exit extraction unit 134, and both can enter hydrogenation unit 140. In hydrogenation unit 140, unsaturated hydrocarbons can be contacted with an optional catalyst and hydrogen to produce saturated hydrocarbon stream 142 that includes C5+ hydrocarbons. In some embodiments, the C5+ hydrocarbons includes substantially C6 to C12 saturated hydrocarbons. Saturated hydrocarbon stream 142 can exit hydrogenation unit 140 and enter separation unit 104 and/or be mixed with full naphtha stream 102 to continue the process. In some embodiments, saturated hydrocarbon stream 142 can be fed to catalytic cracker 114. Hydrogenation conditions can include temperature, pressure, weight hourly space velocity, residence time or a combination thereof.

Figure 2:
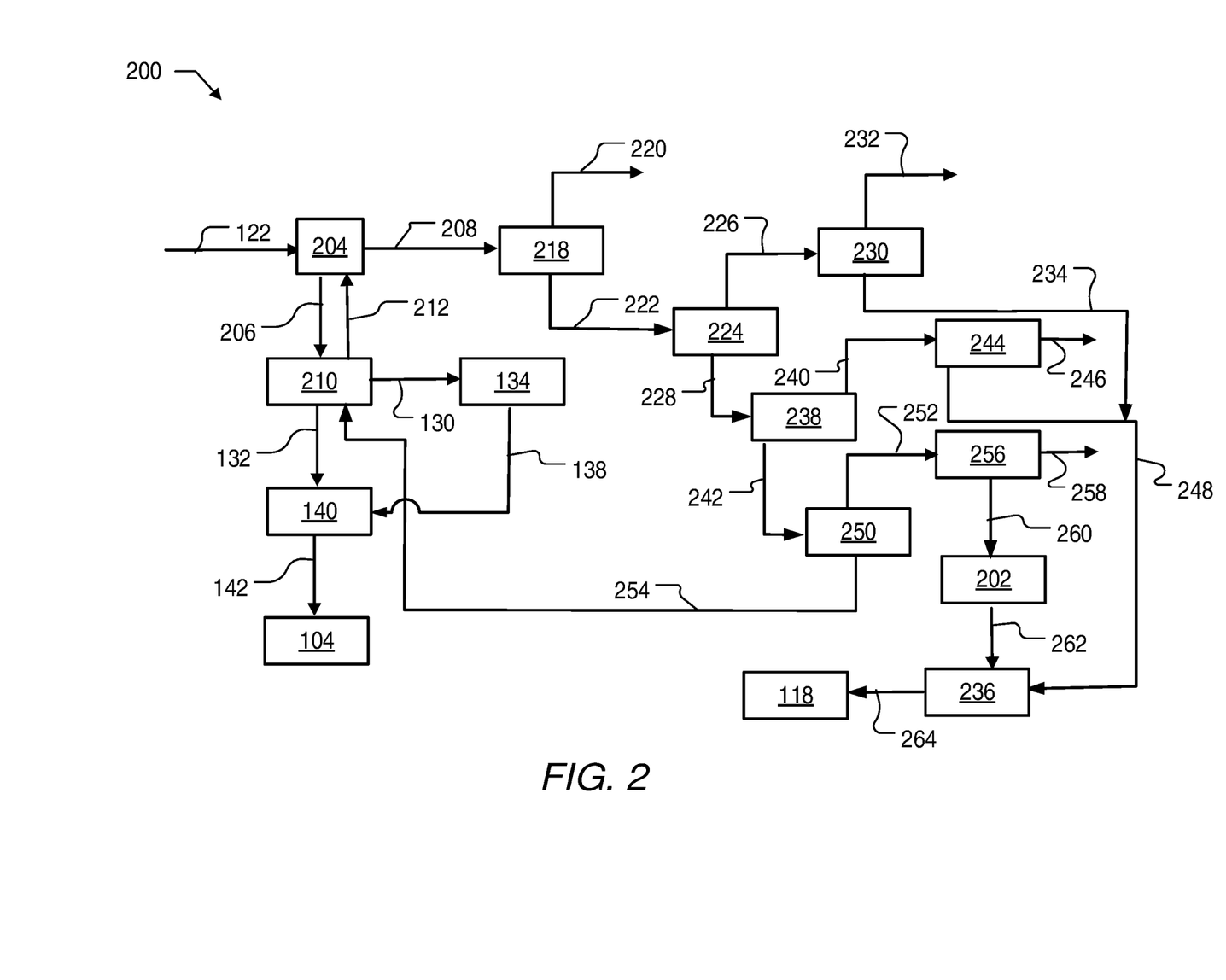
FIG. 2 shows an illustration of a system of the present invention to separate C1 to C5 hydrocarbon streams.

Referring to FIG. 2, a non-limiting example of a separation system 200 that includes separation unit 126 is illustrated. Separation system 200 can include one or more separation units 126 capable of separating third stream 122 into multiple product streams of value, and a hydrogenation unit 202. By way of example, separation unit can include one or more compressors, a de-methanizer, a de-ethanizer, a de-propanizer, a de-butanizer, a de-hexanizer and the like. Separation unit or facility can also be capable of purifying streams to remove impurities such as oxygen, organic acids and the like. Such units are known in the art.

Compressor unit 204, can receive third product stream 122 and compress third stream 122 and produce a C5+ hydrocarbons stream 206 (e.g., BTX containing stream 130 and/or heavy intermediate stream 132) and/or C5– hydrocarbons stream 208 (e.g., light intermediate stream 128). Compressor unit 204 can be a 2 stage compressor. C5+ hydrocarbons stream 206 can enter de-hexanizer 210 and be separated into BTX containing stream 130, and heavy intermediate stream 132, and light C5– hydrocarbon stream 212. BTX containing stream 130 can enter aromatic extraction unit 134 and be processed as described above to produce stream 142. Heavy intermediate stream 132 can include C6+ hydrocarbons that are not aromatic, for example, C6 to C12 alkanes and alkenes and/or aromatic compounds that are not BTX. Non-limiting examples of C6 to C12 alkanes and alkenes include hexane, hexene, heptane, heptene, octane, octene, nonane, nonene, decane, decene, undecane, undecene, dodecane, and dodecene. Heavy intermediate stream 132 can exit de-hexanizer 210 and enter hydrogenation unit 140 and be processed as described above to continue the cycle. Light C5– hydrocarbon stream 212 can exit de-hexanizer 210 and enter compressor unit 204 to be further processed.

C5– hydrocarbons stream 208 can exit compressor 204 and enter de-methanizer unit 218. In de-methanizer unit 218, methane stream can be separated from C5– hydrocarbons stream 208 to produce methane stream 220 and C2 to C5 hydrocarbons stream 222. Methane stream 220 be stored, transported, and/or provided to other processing units.

C2 to C5 hydrocarbons stream 222 can exit de-methanizer unit 218 and enter de-ethanizer unit 224. In de-ethanizer unit 224, C2 hydrocarbons can be separated from C2 to C5 hydrocarbons stream 222 to produce C2 hydrocarbons stream 226 and C3 to C5 hydrocarbons stream 228. C2 hydrocarbons stream 226 can enter separation unit 230 where ethylene stream 232 and ethane stream 234 can be produced. Ethane 234 can exit separation unit 230 and be stored in collection unit 236. Ethylene stream 232 can be stored, transported, and/or provided to other processing units.

C3 to C5 hydrocarbons stream 228 can exit de-ethanizer unit 224 and enter de-propanizer unit 238. In de-propanizer unit 238, C3 hydrocarbons, which includes propane and propylene, can be separated from C3 to C5 hydrocarbons stream 228 to produce C3 hydrocarbons stream 240 and C4 to C5 hydrocarbons stream 242. C3 hydrocarbons stream 240 can enter separation unit 244 where propylene stream 246 and propane stream 248 can be produced. Propane stream 248 can exit separation unit 230 and be stored in collection unit 236. Propylene stream 246 can be stored, transported, and/or provided to other processing units.

C4 to C5 hydrocarbons stream 242 can exit de-ethanizer unit 238 and enter de-butanizer unit 250. In de-butanizer unit 250, C4 hydrocarbons, which includes butane, butenes and butadiene, can be separated from C4 to C5 hydrocarbons stream 242 to produce C4 hydrocarbons stream 252 and C5 hydrocarbons stream 254. C4 hydrocarbons stream 252 can enter separation unit 256 where C4 olefins stream 258, which includes butenes and butadiene, and butane stream 260 can be produced. Butane containing stream 260 can include butenes, C4 di-olefins, and C4 acetylenes. Butane containing stream 260 can exit separation unit 256 and enter hydrogenation unit 202. In hydrogenation unit, olefins in butane containing stream 260 can be hydrogenated to produce saturated hydrocarbon (alkanes) stream 262. Hydrogenation conditions can include temperature, pressure, weight hourly space velocity, residence time or a combination thereof.

The saturated hydrocarbons stream 262 can exit hydrogenation unit 202 and be stored in collection unit 236. C4 olefins stream 258 can be stored, transported, and/or provided to other processing units. C5 hydrocarbons stream 254 can be provided to de-hexanizer unit 210 and/or compressor 202 for further processing.

In collection unit 236, C2 to C4 alkanes can be collected and provided as separate streams or a collective hydrocarbon stream 264 to steam cracking unit 118 to continue the production of value added products of ethylene, propylene, and C4 olefins. In some embodiments, hydrocarbon stream 264 can include the unreacted C2 to C4 hydrocarbons of the process.

In the context of the present invention, at least the following 17 embodiments are described. Embodiment 1 is a method of producing benzene, toluene, and/or xylene and C2 to C4 olefins. The method includes: (a) separating a feed stream containing full range naphtha having an initial boiling point of 20° C. and a final boiling point of 250° C. to produce a first stream containing C5− hydrocarbons and a second stream containing C5+ hydrocarbons; (b) subjecting the first stream to steam cracking conditions sufficient to produce a stream containing C2 to C4 olefins; (c) subjecting the second stream to catalytic cracking conditions sufficient to produce a stream containing one or more of benzene, toluene, and xylene (BTX); (d) combining the stream containing C2 to C4 olefins and the stream containing BTX to produce a third stream; and (e) separating the third stream to form at least one of a benzene stream, a toluene stream, a xylene stream, an ethylene product stream, a propylene product stream, and/or a C4 olefins product stream. Embodiment 2 is the method of embodiment 1, further including recycling unreacted C2 to C4 hydrocarbons to the steam cracking of step (b) and/or recycling unreacted C5+ hydrocarbons to the catalytic cracking of step (c) or the separating of step (a). Embodiment 3 is the method of either of embodiments 1 or 2, wherein the second stream is heated to a temperature of 300 to 500° C. prior to or the catalytic cracking of step (c). Embodiment 4 is the method of any one of embodiments 1 to 3, further including separating the BTX product stream to obtain streams of benzene, toluene, and xylene. Embodiment 5 is the method of any one of embodiments 1 to 4, wherein the first stream is a gaseous stream, the second stream has an initial boiling point of 90° C. and a final boiling point of 210° C., or both. Embodiment 6 is the method of any one of embodiments 1 to 5, wherein combining the streams produces a light hydrocarbons stream, and wherein the light hydrocarbons stream is combusted to generate heat for the catalytic cracking of step (c). Embodiment 7 is the method of any one of embodiments 1 to 6, wherein separating the third stream produces a stream containing the C2 to C4 olefins and an intermediate stream containing the BTX. Embodiment 8 is the method of embodiment 7, further including separating the intermediate stream into a stream containing the BTX and a non-BTX stream containing unsaturated hydrocarbons. Embodiment 9 is the method of either one of embodiments 7 or 8, wherein the stream containing BTX is subjected to conditions suitable to produce the BTX product stream and a second non-BTX stream containing the unsaturated hydrocarbons. Embodiment 10 is the method of either one of embodiments 8 or 9, further including hydrogenating the non-BTX stream containing unsaturated hydrocarbons and/or the second non-BTX stream containing unsaturated hydrocarbons to produce a saturated hydrocarbons stream and providing the saturated hydrocarbons stream to the separating of step (a). Embodiment 11 is the method of any one of embodiments 7 to 10, wherein the stream containing the C2 to C4 olefins is subjected to conditions suitable to separate the C2 to C4 olefins and produce streams of ethylene, propylene, C4 olefins, and the unreacted C2 and C4 hydrocarbon stream. Embodiment 12 is the method of embodiment 11, wherein the unreacted C2 to C4 hydrocarbon stream is provided to the steam cracking of step (b). Embodiment 13 is the method of either of embodiments 11 or 12, wherein the separating conditions include de-methanizing the stream containing the C2 to C4 olefins to produce methane and a C2+ hydrocarbons stream. The method further includes de-ethanizing the C2+ hydrocarbons stream to produce a C2 hydrocarbons stream and a C3+ hydrocarbons stream and separating the C2 hydrocarbons stream to produce an ethylene stream and a ethane stream. The method still further includes de-propanizing the C3+ hydrocarbons stream to produce a C4+ hydrocarbons stream and separating the C3 hydrocarbons stream to produce a propylene stream and a propane stream. The method also includes de-butanizing the C4+ hydrocarbons stream to produce a C4 hydrocarbons stream and a C5+ hydrocarbons stream, and providing the C5+ hydrocarbons stream to the intermediate BTX stream. In addition, the method includes separating the C4 hydrocarbons stream to produce a C4 stream containing butene and/or butadiene, and a butane stream containing unsaturated hydrocarbons and butane. The method further includes hydrogenating the C4 stream containing unsaturated hydrocarbons and butane to form an stream containing saturated C4 hydrocarbons, and providing at least one of the ethane, propane, and saturated C4 hydrocarbons streams to step (b). Embodiment 14 is the method of embodiment 13, wherein at least two of the ethane, propane, and saturated hydrocarbons streams are combined to form the unreacted C2 to C4 hydrocarbon stream. Embodiment 15 is the method of any one of embodiments 1 to 14, wherein the catalytic cracking conditions include a temperature of 600 to 700° C., a pressure of 1.5 to 3 bar, and residence time of 1 to 10 seconds. Embodiment 16 is the method of embodiment 15, wherein the catalytic cracking catalyst contains alumina, silica, zeolite, or combinations thereof. Embodiment 17 is the method of any one of embodiments 1 to 16, wherein the steam cracking conditions include a temperature of 800 to 900° C., a steam to hydrocarbon ratio of 0.2 to 0.7, and a residence time of 1 to 1000 ms.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein can be utilized. Accordingly, the appended claims are intended to include within their scope such processes, machines, manufacture, compositions of matter, means, methods, or steps.

The invention claimed is:

1. A method of producing benzene, toluene, and/or xylene and $C_2$ to $C_4$ olefins, the method comprising:
   (a) separating a feed stream comprising full range naphtha having an initial boiling point of 20° C. and a final boiling point of 250° C. to produce a first stream comprising C5− hydrocarbons and a second stream comprising C5+ hydrocarbons;
   (b) subjecting the first stream to steam cracking conditions sufficient to produce a stream comprising C2 to C4 olefins;
   (c) subjecting the second stream to catalytic cracking conditions sufficient to produce a stream comprising one or more of benzene, toluene, and xylene (BTX);
   (d) combining the stream comprising C2 to C4 olefins and the stream comprising one or more of the BTX to produce a third stream; and
   (e) separating the third stream to form at least one of a benzene stream, a toluene stream, a xylene stream, an ethylene product stream, a propylene product stream, and/or a C4 olefins product stream.

2. The method of claim 1, further comprising recycling unreacted C2 to C4 hydrocarbons to the steam cracking of step (b) and/or recycling unreacted C5+ hydrocarbons to the catalytic cracking of step (c) or the separating of step (a).

3. The method of claim 1, wherein the second stream is heated to a temperature of 300 to 500° C. prior to the catalytic cracking of step (c).

4. The method of claim 3, wherein separating the third stream produces a stream comprising the C2 to C4 olefins and an intermediate stream comprising the BTX.

5. The method of claim 1, wherein the separating of step (e) comprises forming a BTX product stream and separating the BTX product stream to obtain streams of benzene, toluene, and xylene.

6. The method of claim 5, wherein separating the third stream produces a stream comprising the C2 to C4 olefins and an intermediate stream comprising the BTX.

7. The method of claim 1, wherein the first stream is a gaseous stream, the second stream has an initial boiling point of 90° C. and a final boiling point of 210° C., or both.

8. The method of claim 7, wherein separating the third stream produces a stream comprising the C2 to C4 olefins and an intermediate stream comprising the BTX.

9. The method of claim 1, further comprising cooling the third stream to form a light hydrocarbons stream, wherein the light hydrocarbons stream is combusted to generate heat for the catalytic cracking of step (c).

10. The method of claim 1, wherein separating the third stream produces a stream comprising the C2 to C4 olefins and an intermediate stream comprising the BTX.

11. The method of claim 10, further comprising separating the intermediate stream into a stream comprising BTX and a non-BTX stream comprising unsaturated hydrocarbons.

12. The method of claim 11, wherein the stream comprising BTX is subjected to conditions suitable to produce a BTX product stream and a second non-BTX stream comprising the unsaturated hydrocarbons.

13. The method of claim 12, further comprising hydrogenating the non-BTX stream comprising unsaturated hydrocarbons and/or the second non-BTX stream comprising unsaturated hydrocarbons to produce a saturated hydrocarbons stream and providing the saturated hydrocarbons stream to the separating of step (a).

14. The method of claim 10, wherein the stream comprising the C2 to C4 olefins is subjected to conditions suitable to separate the C2 to C4 olefins and produce streams of ethylene, propylene, C4 olefins, and the unreacted C2 and C4 hydrocarbon stream.

15. The method of claim 14, wherein the unreacted C2 to C4 hydrocarbon stream is provided to the steam cracking of step (b).

16. The method of claim 14, wherein the separating conditions comprise:
   de-methanizing the stream comprising the C2 to C4 olefins to produce a methane stream and a C2+ hydrocarbons stream;
   de-ethanizing the C2+ hydrocarbons stream to produce a C2 hydrocarbons stream and a C3+ hydrocarbons stream and separating the C2 hydrocarbons stream to produce an ethylene stream and an ethane stream;
   de-propanizing the C3+ hydrocarbons stream to produce a C3 hydrocarbons stream and C4+ hydrocarbons stream and separating the C3 hydrocarbons stream to produce a propylene stream and a propane stream;
   de-butanizing the C4+ hydrocarbons stream to produce a C4 hydrocarbons stream and a C5+ hydrocarbons stream, and providing the C5+ hydrocarbons stream to the intermediate BTX stream;
   separating the C4 hydrocarbons stream to produce a C4 stream comprising butene and/or butadiene, and a butane stream comprising unsaturated hydrocarbons and butane;
   hydrogenating the butane stream comprising unsaturated hydrocarbons and butane to form a stream comprising saturated C4 hydrocarbons; and
   providing at least one of the ethane stream, the propane stream, and the stream comprising saturated C4 hydrocarbons to step (b).

17. The method of claim 16, wherein at least two of the ethane, propane, and saturated hydrocarbons streams are combined to form the unreacted C2 to C4 hydrocarbon stream.

18. The method of claim 1, wherein the catalytic cracking conditions comprise a temperature of 600 to 700° C., a pressure of 1.5 to 3 bar, and a residence time of 1 to 10 seconds.

19. The method of claim 18, wherein the catalytic cracking catalyst comprises alumina, silica, zeolite, or combinations thereof.

20. The method of claim 1, wherein the steam cracking conditions comprise a temperature of 800 to 900° C., a steam to hydrocarbon ratio of 0.2 to 0.7, and a residence time of 1 to 1000 ms.

* * * * *